Oct. 19, 1943. J. M. LUKER 2,332,328
HINGE DEVICE
Filed Dec. 15, 1942

INVENTOR.
JACKSON M. LUKER
BY
Zugelter, Kinney & Zugelter
ATTORNEYS

Patented Oct. 19, 1943

2,332,328

UNITED STATES PATENT OFFICE 2,332,328

HINGE DEVICE

Jackson M. Luker, Urbana, Ill.

Application December 15, 1942, Serial No. 469,110

5 Claims. (Cl. 287—99)

This is a continuation in part of my copending patent application Serial Number 338,749, filed June 4, 1940.

This application is filed in accordance with Rule 42.

This invention relates to hinge devices, and more particularly to hinge devices of the general class adapted for use with auto seats, studio couches, load leveling devices and the like, wherein it is desirable to selectively maintain certain relatively movable elements in any one of several positions.

An object of the present invention is to provide a hinge device for auto seats, studio couches and the like, wherein the rear cushions may be disposed at substantial right angles to and in the plane of the seat cushions.

Another object of the present invention is to provide a sturdy, yet inexpensive hinge device which may be simply and easily attached to the standard front seat hinge mechanism of an automobile whereby the rear cushion may be lowered rearwardly of and into the plane of its respective seat cushion for providing a bed.

Another object of the present invention is to provide a hinge device having the hereinabove described characteristics which will permit the adjacent edges of a rearwardly lowered rear cushion and its seat cushion to be in abutment whereby the resultant bed is coplanar and continuous.

A further object of the invention is to provide a hinge device which is particularly adapted for studio couch use in providing a frame structure for supporting the rear cushions and their respective springs in an upright position relative to the seat cushions, and which will permit the frame structure to be swung rearwardly of and into the plane of the seat cushions for providing a level double bed.

Still a further object of the present invention is to provide a novel hinge device which is structurally simple, sturdy and adapted to be manufactured in great quantities as well as being foolproof and dependable in operation.

These and other objects are attained by the means described herein and disclosed in the accompanying drawing, in which.

Figures 3, 4, 5:
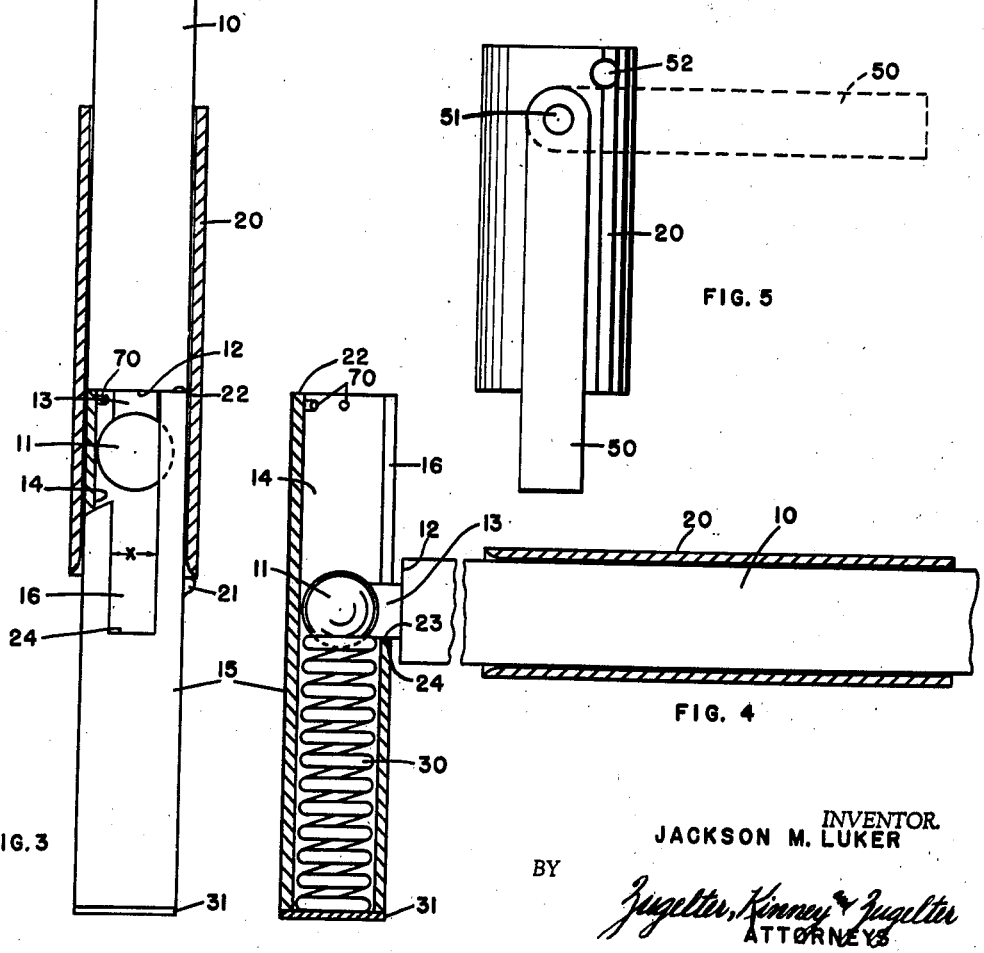
Fig. 3 is an enlarged rear view, partly in section of the hinge structure of the studio couch of Fig. 1.
Fig. 4 is a side view, partly in section, of the hinge structure of Fig. 3 showing the hinge in a broken condition.
Fig. 5 is a side view of a modified form of linkage sleeve comprising a detail of the present invention.

With reference to Fig. 3, the numeral 10 represents a linkage member which is adapted to be selectively maintained in one or the other of two normal positions, viz., in the upright position disclosed in Fig. 3, or in the lowered position disclosed in Fig. 4. The upper portion of linkage member 10 may comprise the side rail of a rack, or other structure, or it may comprise the leg of a U-shaped rear cushion supporting member of a studio couch. The lower portion of linkage member 10 may terminate in a ball member 11 which is rigidly secured to, but spaced from, the lower edge 12 of the linkage member by means of shank 13. Ball 11 is adapted to slidably engage vertical channelway 14 which is provided in a standard 15, which standard may comprise a length of hollow tubular stock having an outside diameter substantially equal to the outside diameter of linkage member 10. A vertical open-topped, closed-bottomed slot 16 may be provided in standard 15, the width of said slot as denoted by the letter X, being of a dimension slightly greater than the width of shank 13 whereby said shank may freely slide relative to said slot. Pins, denoted generally by the numeral 70 may be provided adjacent the upper open end of standard 15 for precluding accidental or unintentional withdrawal of ball 11 from channelway 14.

A sleeve 20 is adapted to slidably engage the outer surface of linkage member 10 and standard 15, said sleeve adapted to maintain linkage member 10 in axial alignment with standard 15, when the sleeve is disposed in the position illustrated in Fig. 3. If desired, a stop member 21 may be secured to and carried by the outer face of standard 15 for limiting the downward travel of sleeve 20 relative to the standard.

In order to lower the linkage member relative to the standard, sleeve 20 may be slid upwardly onto and along linkage member 10 by an amount sufficient to expose the joint formed by the abutting adjacent ends 12 and 22 of the linkage member 10 and standard 15, respectively. By thus raising sleeve 20 from engagement with standard 15 the upper end of slot 16 will be exposed, thereby permitting linkage member 10 to be swung relative to standard 15 for locating shank 13 in slot 16. The linkage member 10 may then be lowered horizontally until face 23 of shank 13 engages and comes to rest upon bottom 24 of slot 16, as disclosed in Fig. 4.

In some instances it may be desirable to provide a spring, denoted generally by the numeral 30, interiorly of standard 15 and between a bottom plate 31 and ball 11, for precluding the rapid dropping of ball 11 within standard 15 incident to lowering of linkage member 10. Spring 30 will likewise facilitate lifting of the end of linkage member toward the top of standard 15 when it is desirable to return the linkage member to the upright position disclosed in Fig. 3.

Figures 1, 2:
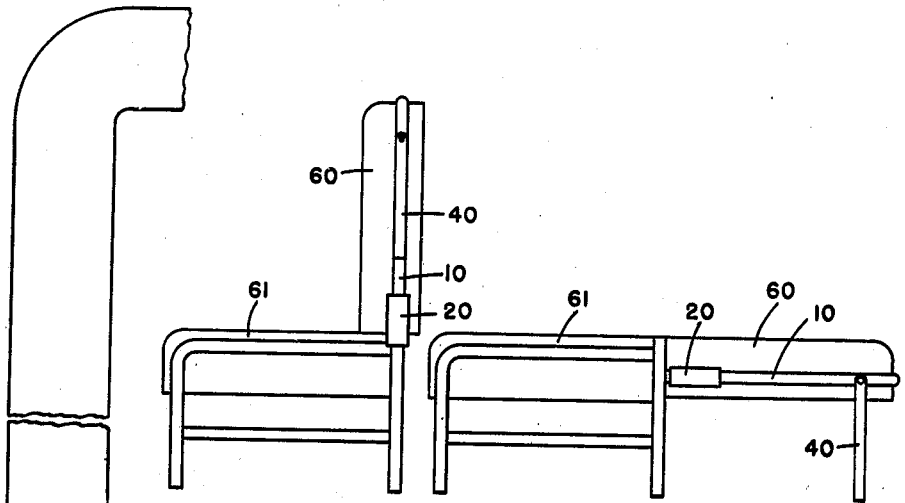
Fig. 1 is a side elevational view of a studio couch with the rear cushion in its normal upright position for providing a back rest for the seat portion of the couch.
Fig. 2 is a view similar to Fig. 1 showing the rear cushion in an open, lowered, or fully extended position.

In those instances where the hereinabove described linkage structure is associated with a studio couch, an auxiliary leg or support member 40 may be pivotally secured to and carried by linkage member 10 for movement from an inoperative position disclosed in Fig. 1 to the operative position disclosed in Fig. 2. It should be observed that the presence of leg or bracket 40 does not affect the operating characteristics of the instant linkage structure.

In those instances where the present linkage structure is utilized for providing a hinge connection between the back cushion and seat cushion of an automobile, sleeve 20 may be provided with an actuating arm 50 pivotally mounted to the upper end thereof by pivot pin 51. Actuator arm 50 will normally be disposed in the position indicated by the solid lines in Fig. 5 wherein its longitudinal axis is in axial alignment with sleeve 20. Actuator arm 50 may be swung upwardly about pivot 51 to the fully raised position indicated by the dotted lines of Fig. 5, in which position it forms a handle which may be grasped by an operator for sliding the sleeve 20 upwardly onto hinge member 10 for exposing slot 16 of standard 15. The arc through which actuator arm 50 may be swung may be limited and determined by stop member 52, as illustrated. If desired, actuator arm 50 may be utilized as a supporting leg for those portions of linkage member 10 which are disposed remotely from ball 11, it being understood that sleeve 20 may be freely slid along linkage member 10 to any desired position.

With reference to Fig. 4, it will be observed that the lower end 12 of linkage member 10, when in a lowered position, will be maintained in close proximity to the outer face of standard 15, that is, within one-fourth of an inch thereof, wherefore the bottom edge of whatever cushions may be carried by linkage member 10 will be disposed in substantial contact with the rear face of its associated seat cushion. By controlling the location of bottom 24 of slot 16 the seat back may be disposed in the plane of the seat bottom for providing a flat supporting surface.

In operation it will be observed that the back rest 60 may be disposed in an upstanding position at approximately right angles relative to the seat cushion 61, or it may be moved to a position alongside of and level with said seat. When sleeve 20 has been lifted by an amount sufficient to permit relative motion between linkage member 10 and standard 15, the back rest may be moved about the pivot formed by the interaction between ball 11 and channelway 14 of the standard for locating shank 13 within slot 16, after which the back rest may be vertically lowered relative to standard 15 to the position disclosed in Figs. 2 and 4.

It should be understood that whereas but one linkage structure has been disclosed, that each automobile seat, studio couch, and the like will be provided with duplicate, complementary hinge structures, one for each side.

If desired, the present hinge structure may be utilized to provide adjustable compartments such as are used in delivery wagons, particularly in bakery trucks, and the like. When so used a pair of linkage members 10 would be disposed on opposite sides of the truck and interconnected by rods, or the like, so that when the linkage members are disposed in an upstanding position (Fig. 3) the interconnecting rods will comprise a lateral vertical partition member. Said lateral partition may be quickly and expeditiously lowered to permit access to the goods disposed therebehind, and if desired, to provide a serving tray therefor, when lowered to the position as disclosed in Fig. 4.

From the foregoing it is apparent that I have provided a compact structurally simple hinge device which may be sold as standard equipment, or which may be later attached as an accessory to seat structures such as found in automobiles, studio couches, and the like.

It should be understood that various changes and modifications in the structural details of the device may be made within the scope of the appended claims, without departing from the spirit of the invention.

What is claimed is:

1. A hinge device comprising in combination, a hollow tubular standard, a closed-bottomed open-topped slot provided in said standard and in open communication with the interior thereof, a linkage member terminating in a forwardly projecting shank dimensioned to slidably engage the slot of said standard, a ball secured to and spaced from the end of said linkage member by means of said shank, said ball dimensioned to slidably engage the interior of said standard, a sleeve dimensioned to slidably engage the outer surfaces of the standard and linkage member, said sleeve adapted to simultaneously engage said standard and linkage member for maintaining them in axial alignment, said sleeve adapted to be disposed entirely on said linkage member for exposing the slot in said standard for reception of said shank and for providing a pivotal connection between said linkage member and standard whereby said linkage member is adapted to be lowered to a position at substantial right angles with said standard and then be lowered relative thereto until said shank abuts on the bottom of said slot.

2. A hinge device including a standard and a linkage member pivotally secured thereto and adapted to be disposed in one or the other of two normal positions relative to said standard, in axial alignment therewith, or at substantial right angles thereto, said standard comprising a hollow tubular member having an upper open end, a closed-bottomed open-topped slot provided in said standard and in open communication with the interior thereof, said linkage member comprising a tubular member having an end which terminates in a forwardly projecting shank dimensioned to slidably engage the slot of said standard, a ball secured to and carried by said shank, said ball dimensioned to slidably engage the interior of said standard, and a sleeve dimensioned to slidably engage said linkage member and standard, said sleeve adapted to simultaneously engage said linkage member and standard for precluding relative motion therebetween and for maintaining them in axial alignment, said sleeve likewise being adapted to be disposed entirely on said linkage member for providing a pivotal connection between and about which said linkage member may be moved to a position alongside of said standard.

3. A hinge device including a standard and a linkage member pivotally secured thereto and adapted to be disposed in one or the other of two normal positions relative to said standard, the one in axial alignment therewith, the other at substantial right angles therewith, said standard comprising a hollow tubular member having an upper open end, an open-topped closed-bottomed slot provided in said standard and in open communication with the interior thereof, said linkage member comprising a tubular member one end of which terminates in a forwardly projecting shank dimensioned to slidably engage the slot of said standard, a spherical head secured to and carried by said shank, said head dimensioned to slidably engage the interior of said standard, a sleeve dimensioned to slidably engage the outer surface of said standard and linkage member, said sleeve adapted to simultaneously engage said linkage member and standard for maintaining them in axial alignment, said sleeve being adapted to be disposed entirely on said linkage member for exposing the slot of said standard to the shank of the linkage member for providing a pivotal connection about said head, said shank adapted to be lowered relative to said slot until it rests upon the bottom thereof, a sleeve actuating arm pivotally secured to said sleeve and movable from an inoperative position in parallelism with said sleeve to an operative position at substantial right angles thereto, stop means carried by said sleeve for determining the operative position of said arm, said arm adapted to engage a supporting surface for supporting that portion of the linkage member remote from the shank when the linkage member is in a lowered position at substantial right angles with said standard.

4. A hinge device comprising in combination, a hollow tubular standard including an open upper end and a closed bottom end, a closed-bottomed open-topped slot provided in said standard and in open communication with the interior thereof, a linkage member adapted to be disposed in one of two normal positions relative to said standard, one in axial alignment with said standard, the other at substantial right angles to the longitudinal axis of said standard, a shank projecting from an end of said linkage member, a spherical head secured to and carried by said shank, said shank adapted to slidably engage the slot of said standard, said spherical head dimensioned to slidably engage the interior of said standard, a sleeve dimensioned to slidably engage the outer surface of said standard and linkage member, said sleeve adapted to simultaneously engage adjacent portions of said standard and linkage member for maintaining said linkage member in axial alignment with said standard, said sleeve adapted to be disposed entirely upon the linkage member for exposing the slot of said standard for reception of the shank of said linkage member to provide a pivotal connection between the spherical head carried by the linkage member in cooperation with the interior of said standard, said linkage member adapted to be swung downwardly about said pivotal connection to a position at substantial right angles with said standard, after which said linkage member may be vertically lowered relative to the standard until said shank abuts the bottom of said slot, resilient means disposed between the bottom of said standard and said spherical head for normally urging said head upwardly toward the open top of the standard, and means disposed adjacent the upper open end of the standard for precluding withdrawal of said spherical head from engagement with the interior of said standard.

5. A hinge device comprising in combination, a hollow tubular standard, a closed-bottomed open-topped slot provided in said standard and in open communication with the interior thereof, a linkage member terminating in a forwardly projecting shank dimensioned to slidably engage the slot of said standard, a ball secured to and spaced from the end of said linkage member by means of said shank, said ball dimensioned to slidably engage the interior of said standard, a sleeve dimensioned to slidably engage the outer surfaces of the standard and linkage member, said sleeve adapted to simultaneously engage said standard and linkage member for maintaining them in axial alignment, said sleeve adapted to be disposed entirely on said linkage member for exposing the slot in said standard for reception of said shank and for providing a pivotal connection between said linkage member and standard whereby said linkage member is adapted to be lowered to a position at substantial right angles with said standard and then be lowered relative thereto until said shank abuts on the bottom of said slot, and stop means carried by said standard and engageable by said sleeve for positioning said sleeve relative to said linkage member and standard when said sleeve is simultaneously engaging said standard and linkage member.

JACKSON M. LUKER.